July 19, 1927.
W. C. NIEWALD
LOCKING DEVICE FOR DEMOUNTABLE RIMS
Filed Aug. 26, 1926   3 Sheets-Sheet 3
1,636,385
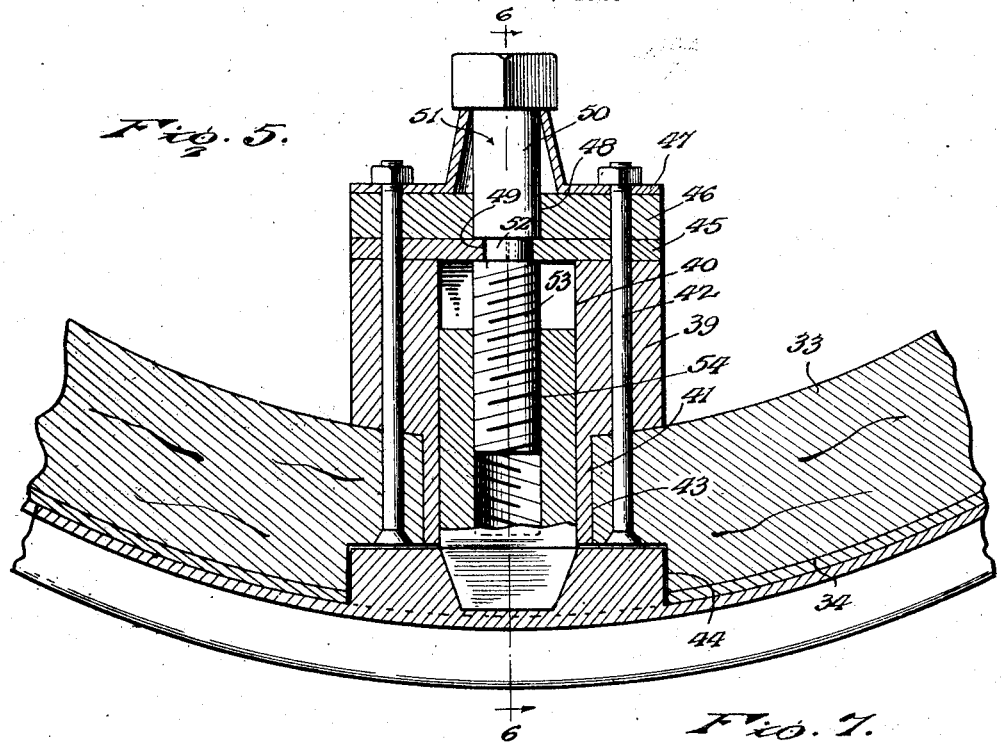
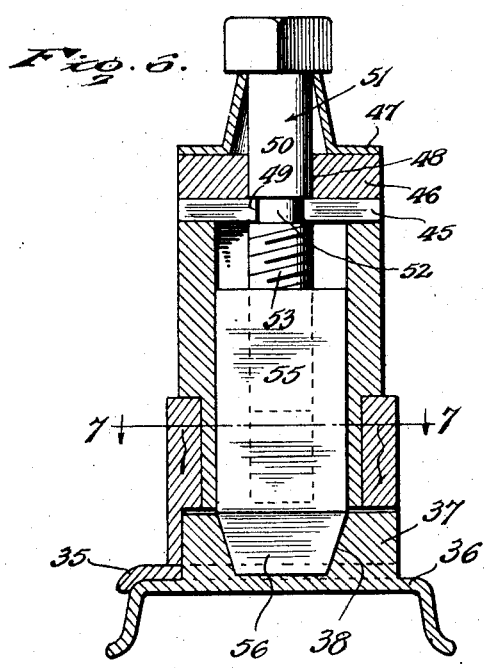
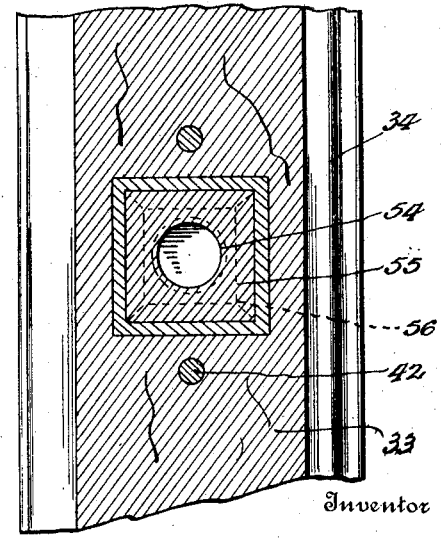
Inventor
*Walter C. Niewald*
By *Lacey & Lacey,* Attorneys Patented July 19, 1927.

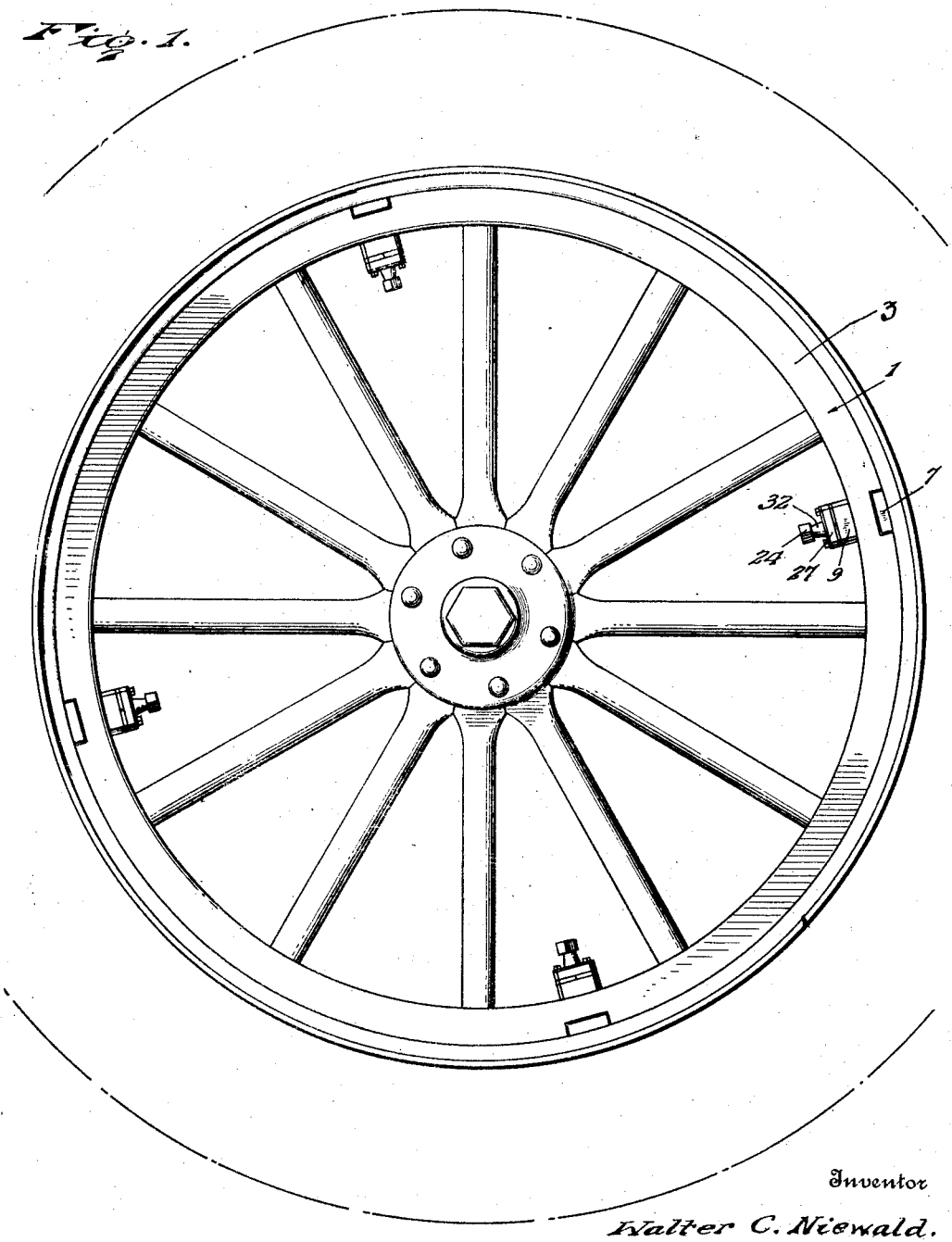

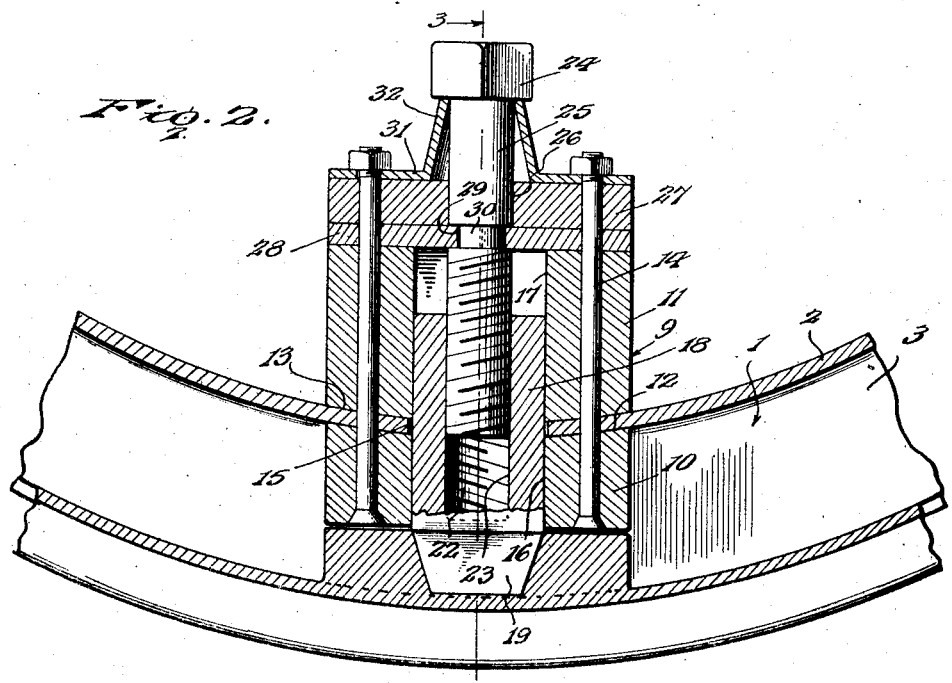

1,636,385

UNITED STATES PATENT OFFICE.

WALTER C. NIEWALD, OF FREEDOM, MISSOURI.

LOCKING DEVICE FOR DEMOUNTABLE RIMS.

Application filed August 26, 1926. Serial No. 131,693.

This invention relates to improvements in locking devices for demountable wheel rims and has as its general object to provide a locking device which possesses marked advantages both as regards the readiness with which it may be operated and its strength and durability, over previously designed devices of this class.

Another object of the invention is to provide a locking device which will be positive in its action so as to securely lock the demountable rim against lateral displacement and also against displacement circumferentially of the wheel, so that there can, in the latter instance, be no cutting of the tire valve such as would be caused by a circumferential creeping of the rim upon the felly of the wheel.

Another object of the invention is to provide a locking device so constructed that when its parts are adjusted to unlock the rim, none of the parts will be separated from the others and consequently there will be no likelihood of loss of any of the parts, the locking device being, furthermore, so constructed that adjustment of the locking member of the device may be effected rapidly both in locking and unlocking the rim.

In the accompanying drawings:

Figure 1 is a side elevation of an automobile wheel equipped with the locking device of the invention.

Figure 2 is a detail sectional view through the locking device which is adapted for embodiment in a wheel having a hollow metal felly.

Figure 3 is a sectional view on the line 3—3 of Figure 2, looking in the direction indicated by the arrows.

Figure 4 is a horizontal sectional view on the line 4—4 of Figure 3, looking in the direction indicated by the arrows.

Figure 5 is a view similar to Figure 2, illustrating the adaptation of the invention to a wheel having a solid wood felly.

Figure 6 is a sectional view on the line 6—6 of Figure 5, looking in the direction indicated by the arrows.

Figure 7 is a horizontal sectional view on the line 7—7 of Figure 6, looking in the direction indicated by the arrows.

In the embodiment of the invention shown in Figures 2, 3 and 4 of the drawings, in which the locking device is adapted for use in connection with a hollow metal felly, the felly is indicated in general by the numeral 1 and is of the usual channeled formation, comprising the inner circumferential wall 2 and side walls 3. The inner side wall 3 of the felly is provided with the usual seating flange 4 for the demountable rim, which rim is indicated in general by the numeral 5, and for a purpose to be presently explained, the outer side wall 3 of the felly is formed at intervals in its circumference with recesses 6 opening through its outer edge.

The demountable rim 5 is applied to the felly 1 in the usual manner, seating upon the flange 4 at one side and upon the edge of the outer wall 3 of the felly at its other side, and at intervals corresponding to the intervals at which the openings 6 are provided in the said outer side wall of the felly, the rim 5 is formed upon its inner side with bosses indicated by the numeral 7, these bosses being of dimensions to pass through the openings 6 when the rim is fitted onto the felly and likewise of dimensions to extend between the inner side wall of the felly and the plane of the outer side wall thereof, thus filling the respective openings 6, as clearly shown in Figure 3 of the drawings. Each of the bosses 7 is formed in its inner side with a seat 8 which is of frusto-pyramidal contour and, therefore, has its side and end walls converging in the direction of the bottom wall of the seat.

The numeral 9 indicates in general a housing for the locking member of the device and this housing comprises substantially rectangular castings, one indicated by the numeral 10 and the other by the numeral 11. The casting 10 has a curved face 12 and the casting section 11 has a curved face 13, and the section 10 is disposed within the channel of the hollow felly with its face 12 engaging against the bottom wall of the said felly, the section 11 being disposed against the outer face of the said bottom wall of the felly, and the sections being secured in place through the medium of bolts 14 which are fitted through the sections and through openings in the said wall 2 of the felly. The wall 2 of the felly is provided with a rectangular opening 15 and the sections 10 and 11 of the housing are provided respectively with centrally located rectangular openings 16 and 17 which substantially register with the opening 15. It will be observed by reference to Figures 2 and 3 of the drawings that the outer end of the opening 16 in the housing section 10 is substantially registered with the open side of the socket 8. The locking member of the device is indicated by the numeral 18 and the said member comprises a rectangular body which is slidably adjustably fitted in the openings 16 and 17 and is provided at its outer end with a tapered portion 19 of frusto-pyramidal form which, in the locking position of the said member, has wedging engagement in the respective socket 8, as shown in Figures 2 and 3 of the drawings. The locking member 18 fits relatively snugly in the openings 16 and 17 so that there is no loose play of the member and, therefore, when the member is in its locking position the rim 5 is securely held in position upon the felly 1, due to the engagement of the end 19 of the locking member in the socket 8, the engagement being such, as will be obvious, as to preclude any lateral displacement of the rim with respect to the felly and likewise any circumferential creeping or displacement of the said rim with respect to the felly.

Adjustment of the locking member 18 is effected through the medium of a bolt which is indicated by the numeral 20 and the shank of the bolt for a portion of its length is provided with threads 21 preferably having a pronounced pitch or inclination so that when the bolt is rotated, the coaction of these threads with the correspondingly formed threads 22 formed in the wall of a bore 23 centrally located within the locking member 18, will effect quick adjustment of the said locking member considering the relatively few turns required to be given the bolt to effect such adjustment. The bolt is provided at the other end of its shank with a polygonal head 24 for the application of a wrench and for a portion of its length extending from the said head, the shank of the bolt is cylindrical, as indicated by the numeral 25, and this portion of the shank fits rotatably in an opening 26 in a cap plate 27 which is secured in place by the bolts 14. Plates 28 are interposed between the cap plate 27 and the inner end of the housing section 11 and are likewise secured in place by the said bolts 14, and the meeting edges of these plates are formed with semi-circular recesses 29 so that when the plates are matched an opening is provided smaller than the opening 26 and smaller than the diameter of the bore 23, and the walls of the recesses 29 engage in a groove 30 which is formed circumferentially in the shank of the bolt between its threaded portion 21 and its smooth cylindrical portion 25. In this manner, the bolt is restrained against any longitudinal movement and is securely supported for rotative adjustment. The numeral 31 indicates a cap member, preferably of heavy sheet metal, which is secured upon the outer side of the cap plate 27 and has a hollow conical portion 32 surrounding the portion 25 of the shank of the bolt and engaged by the head 24. This member 31 is secured in place by the bolts 14 and serves the purpose of excluding dust and dirt from the shank portion 25 of the bolt.

From the foregoing description of this embodiment of the invention, it will be evident that by rotating the bolt in one direction, the locking member 18 will be adjusted slidably in the openings 16 and 17 in the housing sections and will have its end 19 retracted from engagement in the socket 18 whereupon, when all of the bolts of the devices with which the wheel is equipped have been so adjusted, the rim may be readily removed from the felly. Of course, in the reverse rotative adjustment of the bolts, the corresponding locking members will be slidably adjusted in their housings so as to project their ends 19 into engagement in the sockets 8 and the rim will then be locked in place upon the felly.

Figures 5, 6 and 7 of the drawings, illustrate the invention embodied in a vehicle wheel having a wooden felly which is indicated by the numeral 33 and which is provided with the usual annular wear plate 34 secured in place in the usual manner and having the usual seating flange 35 against which one side of the demountable rim, indicated by the numeral 36, rests in the manner shown in Figure 6. The rim, in this embodiment, is provided with bosses corresponding to the bosses 7 of the previously described embodiment and having frusto-conical sockets 38 which correspond to the sockets 8 previously described. The housing, in this embodiment, is indicated by the numeral 39 and comprises a substantially rectangular casting having a rectangular opening 40 formed therethrough and the said casting is provided with a shank portion 41 through which the opening 40 likewise extends, the open outer end of the shank portion being substantially in registration with the open side of the socket 38. Bolts 42 are secured through the felly 33 in front and in rear of the opening 43 which is formed in the felly, and in which the extension or shank 41 is received, and the felly is formed in its outer side with a recess 44 which accommodates the boss 37 upon the demountable rim 36. The bolts 42 serve to secure upon the inner end of the housing 39, plates 45 which correspond to the plates 28 of the previously described embodiment and a plate 46 corresponding to the plate 27 and likewise a cap member 47 corresponding to the cap member 31. The cap plate 46 is provided with an opening 48 and the plates 45 are provided with semi-circular recesses 49, the opening 48 accommodating the cylindrical portion 50 of the adjusting bolt which is indicated by the numeral 51, and the walls of the recesses 49 engaging in a groove 52 which corresponds to the groove 30 of the bolt of the previously described embodiment and in this manner the said bolt 51 is supported for rotative adjustment with the threaded portion 53 of its shank engaging in the threaded bore 54 formed in the locking member which, in this embodiment, is indicated by the numeral 55. The locking member 55 is provided with a frusto-conical tapered end 56 which, in the locking position of the said member, engages in the socket 38 in the respective boss 37, and it will be evident from the foregoing description of the two embodiments that the invention is the same in both instances, the only difference being the construction of the housing for the locking member to adapt it for application to a hollow felly or a wood felly.

Having thus described the invention, what I claim is:

1. In a locking device for demountable rims, in combination, a wheel felly having a recess opening through one side, a rim having a boss fitting in said recess and provided with a socket, a housing mounted upon the felly, a locking member slidably mounted in the housing for adjustment toward and from the said boss and provided with a portion for engagement in the socket in the boss, the locking member having a threaded bore, a closure for the housing having an opening therein, and a bolt rotatably mounted in the said closure and having a threaded shank portion engaging in the said threaded bore of the locking member, the bolt having a circumferential groove engaged by the wall of the opening whereby to prevent longitudinal displacement of the bolt.

2. In a locking device for demountable rims, in combination, a wheel felly having a recess opening through one side, a rim having a boss fitting in said recess and provided with a socket, a housing mounted upon the felly, a locking member slidably mounted in the housing and having a portion engageable in said socket in one position of adjustment of the locking member, the said locking member having a threaded bore, an adjusting bolt rotatably mounted in the housing and having a threaded portion engaging in the threaded bore of the locking member, means restraining the bolt from longitudinal movement, and a cap member upon the housing having a hollow extension fitting about the portion of the shank of the bolt which projects exteriorly of the housing.

3. In a locking device for demountable rims, in combination, a wheel felly, a rim having a boss provided with a socket, a housing upon the felly, a locking member adjustably slidable in the housing for interlocking engagement with the boss, an adjustable bolt having an annular groove, a cap plate, plates interposed between the cap plate and housing and having their confronting edges engaged in the groove, and bolts to hold the associated parts engaged with the felly.

In testimony whereof I affix my signature.

WALTER C. NIEWALD. [L. S.]